Figure 1:
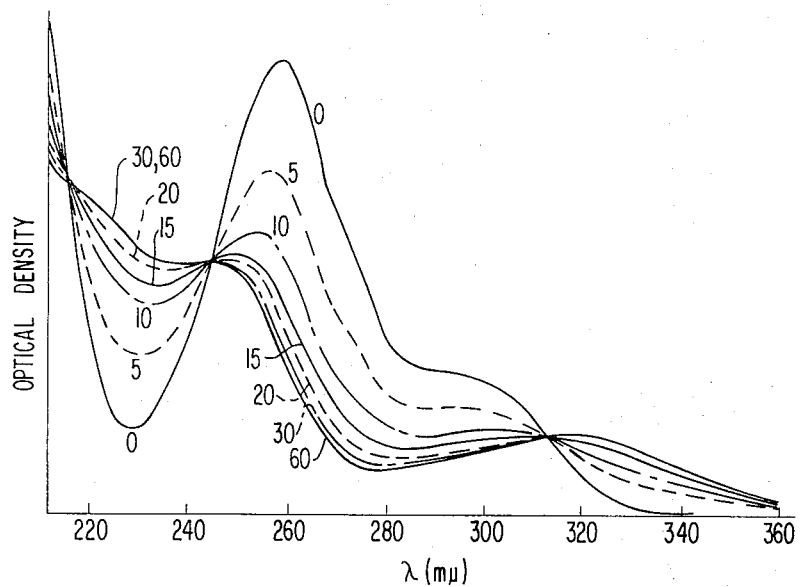

United States Patent [19]
Ono et al.

[11] 3,803,011
[45] Apr. 9, 1974

[54] PROCESS FOR PREPARING 2,3-DIHYDRO-1H, 6H-1,5-BENZODIAZOCINE-2-ONE DERIVATIVE

[75] Inventors: Hisatake Ono; Harumi Katsuyama, both of Asaka, Japan

[73] Assignee: Fuji Photo Film Co., Ltd., Minami Ashigara-shi, Kanagawa, Japan

[22] Filed: Feb. 16, 1972

[21] Appl. No.: 226,742

[30] Foreign Application Priority Data
Feb. 16, 1971  Japan.................................. 46-6922

[52] U.S. Cl........................................ 204/158 R
[51] Int. Cl....................................... B01j 1/10
[58] Field of Search.......................... 204/158 R

[56] References Cited
UNITED STATES PATENTS
3,423,302   1/1969   Slates et al..................... 204/158 R
3,555,022   1/1971   Field et al....................... 204/158 R

*Primary Examiner*—Howard S. Williams
*Attorney, Agent, or Firm*—Sughrue, Rothwell, Mion, Zinn & Macpeak

[57] ABSTRACT

A process for preparing 2,3-dihydro-1H,6H-1,5-benzodiazocine-2-one derivatives represented by the formula (II), comprising irradiating an organic solution of spiro(indoline-2,5'-isoxazoline-2) represented by the formula (I) with light

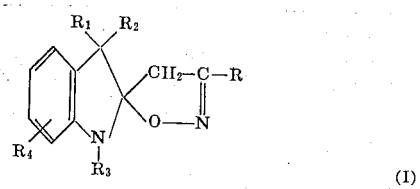

(I)

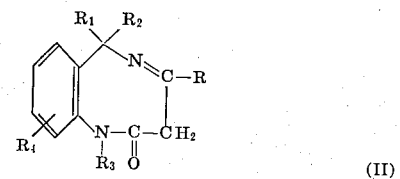

(II)

wherein $R_1$, $R_2$ and $R_3$ each represents a hydrogen atom or alkyl group having 1–4 carbon atoms, $R_4$ represents a hydrogen atom, alkyl group having 1–4 carbon atoms, alkoxy group having 1–4 carbon atoms, alkoxycarbonyl group having 1–4 carbon atoms, nitro group, halogen atom or such a substituent that forms dimer bonded through methylene chain, R represents phenyl group substituted by the substituent of $R_4$, or such a substituent that forms dimer bonded through alkyl chain or phenylene group.

15 Claims, 2 Drawing Figures

PROCESS FOR PREPARING 2,3-DIHYDRO-1H, 6H-1,5-BENZODIAZOCINE-2-ONE DERIVATIVE

Since benzodiazocine derivatives belong to a novel heterocyclic group, they are noteworthy compounds because of their pharmacological effects, photoconductivity, etc. But, so far, few processes for the synthesis thereof have been reported. This invention relates to a process for synthesizing such benzodiazocine derivatives of 2,3-dihydro-1H, 6H-1,5-benzodiazocine-2-ones having quite a novel structure, more particularly, it relates to a process for preparing desired 2,3-dihydro-1H, 6H-1,4-benzodiazocine-2-ones by the photoisomerization of spiro (indoline-2,5'-isoxazoline-2) compounds. According to this invention, the compounds having a spiro(indoline-2,5'-isoxazoline-2) skeleton can be easily converted to the corresponding 2,3-dihydro-1H, 6H-1,5-benzodiazocine-2-one compounds by the photochemical isomerization reaction.

The reaction can be described as follows;

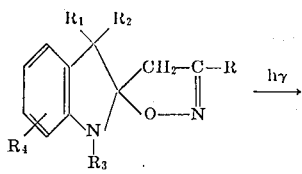

wherein $R_1$, $R_2$ and $R_3$ each represents a hydrogen atom or alkyl group having 1-4 carbon atoms, $R_4$ represents a hydrogen atom, alkyl group having 1-4 carbon atoms, alkoxy group having 1-4 carbon atoms, alkoxycarbonyl group having 1-4 carbon atoms, nitro group, halogen atom or such a substituent that forms a dimer bonded through a methylene chain, R represents a phenyl group substituted by the substituent of $R_4$, or such a substituent that forms a dimer bonded through an alkyl chain or phenylene group.

The starting material used in the reaction of this invention was newly synthesized by us before, and the process thereof has been submitted to the Japanese Patent Office as "Process for preparing compounds having a novel spiro (indoline-2,5'-isoxazoline) structure." (Japanese Pat. application No. 86238/70, now Japanese Pat. Publication No. 7101/73, which corresponds to U.S. Pat. application 185818/71, German OLS 2,149,229 and French Pat. application No. 2,109,939).

Every product of this invention exhibits photoconductivity, and is utilized for making a photo-conductive material and, in addition, it is utilized as an intermediate for synthesizing compounds containing a heteroring such as a sensitizing dye, etc.

When the organic solution (e.g., cyclohexane, methanol, tetrahydrofuran, etc.) of spiro(indoline-2,5'-isoxazoline-2) was exposed to the light of high pressure mercury lamp (Toshiba SHL-100UV), and the change of the ultraviolet absorption spectrum thereof was followed, the reaction of this invention was found to be the reaction accompanied by a very quick absorption spectrum change (the reaction was finished within 1 minute at the concentration of $10^{-5}$ mol/l) having an isosbestic point.

FIG. I is the graph on which the change of the ultraviolet absorption spectrum in the photoisomerization reaction of 5-chloro-1,3,3-trimethyl-3'-phenylspiro(indoline-2,5'-isoxazoline-2) to 8-chloro-2,3-dihydro-2-oxo-4-phenyl-1,6,6-trimethyl-1H, 6H-1,5-benzodiazocine was recorded.

The data were observed by exposing the solution of the said compound ($10^{-5}$ mol/l) to the light for 0, 5, 10, 15, 20, 30 and 60 seconds using a Toshiba SHL-100UV high pressure mercury lamp.

Examples of the spiro(indoline-2,5'-isoxazoline-2) which undergoes this photochemical reaction are 1,3,-3-trimethyl-3'-phenylspiro(indoline-2,5'-isoxazoline-2), 5-chloro-1,3,3-trimethyl-3'-phenyl-spiro(indoline-2,5'-isoxazoline-2), 1,3,3-trimethyl-3'-p-tolylspiro (indoline-2,5'-isoxazoline-2), 5-ethoxycarbonyl-1,3,3-trimethyl-3'-p-anisylspiro(indoline-2,5'-isoxazoline-2), 1,3,3-trimethyl-3'-p-chlorophenylspiro(indoline-2,5'-isoxazoline-2), 5'nitro-1,3,3-trimethyl-3'-phenylspiro(indoline-2,5'-isoxazoline-2), 1,3,3-trimethyl-3'-m-nitrophenylspiro(indoline-2,5'-isoxazoline-2), 3', 3''-bis [1,3,3-trimethyl-spiro(indoline-2,5'-isoxazoline-2)], 3', 3''-bis[5-chloro-1,3,3-trimethylspiro(indoline-2,5'-isoxazoline-2)], 3',3''-bis[5-ethoxycarbonyl-1,3,3-trimethylspiro(indoline-2,5'-isoxazoline-2)], 3', 3''-bis[5-methoxy-1,3,3-trimethylspiro(indoline-2,5'-isoxazoline-2)],3',3''-p-phenylenebis [1,3,3-trimethyl-spiro(indoline-2,5'-isoxazoline-2)] and the high molecular weight compound which has the main chain of spiro(indoline-2,5'-isoxazoline-2) and is described as follows;

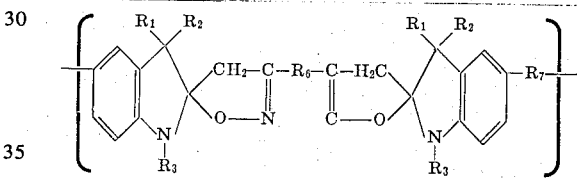

wherein $R_1$, $R_2$ and $R_3$ each represents an alkyl group having 1-4 carbon atoms; $R_6$ represents $+CH_2+_n$ or

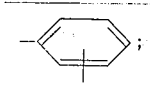

$R_7$ represents $+CH_2+_n$; $n$ being 0, or an integer of from 1 to 3.

The above mentioned 2,3-dihydro-1H,6H-1,5-benzodiazocine-2-ones are novel and, so far, have not been reported in the literature. The structure thereof was decided by the results of elemental analysis and various kinds of instrumental analysis such as ultraviolet absorption spectrum, infrared absorption spectrum, NMR spectrum, mass spectrum, etc., which will be further described in the following Examples.

The reaction solvents suitable for the process making use of the photochemical reaction of this invention are alcohols such as methanol, ethanol, propanol, furfuryl alcohol, benzyl alcohol, ethylene glycol, etc., ethers such as diethyl ether, tetrahydrofuran, dioxane, cellosolve diethyl ether, etc., paraffin such as n-hexane, cyclohexane, pentane, etc., mixed paraffin such as petroleum ether, petroleum benzin, ligroin, etc., aromatic hydrocarbon such as benzene, toluene, xylene, etc., and ketones such as acetone, methylethylketone, cyclohexanone, etc., but halogenated hydrocarbons such as carbon tetrachloride, chloroform, etc. are unsuitable since they generate acidic substances such as hydrogen halogenides by irradiation with ultraviolet rays, thereby changing the structure of the product. As for the light source, ultraviolet rays having a wavelength shorter than 400 m$\mu$ are required and, usually, a high pressure mercury lamp is employed.

The process of this invention will be further explained by the following several Examples.

EXAMPLE 1

300 mg of 5-chloro-3'-phenyl-1,3,3-trimethyl-spiro(indoline-2,5'-isoxazoline-2) is dissolved in 100 ml of tetrahydrofuran, and is exposed to the light using an apparatus of (UVL-300P made by Rikoo Kagaku Sangyo Co., Ltd.) designed for the photochemical reaction.

The process of the reaction was followed by an absorption spectrum change, and the absorption spectrum having two isosbestic points was obtained. The conversion amount $\alpha$ was determined by the change of the absorbancy index at the wavelength of 261 m$\mu$ at which the starting material, 5-chloro-1,3,3-trimethyl-spiro(indoline-2,5'-isoxazoline-2), has its absorption maximum ($\lambda$ max), according to the following formula. The convertion amount $\alpha$ is given in Table 1.

$$\alpha = \epsilon - \epsilon_o / \epsilon_- - \epsilon_o \times 100$$

wherein $\epsilon$ is the absorbancy index at 261 m$\mu$ after t minutes of irradiation, $\epsilon_o$ is the absorbancy index at 261 m$\mu$ at the time $t=0$, and $\epsilon_-$ is the absorbancy index at 261 m$\mu$ at the time $t=60$.

After 60 minutes, the irradiation was discontinued and the resulting reaction solution which was colored yellow was concentrated under reduced pressure to obtain a pale yellow crystal in a quantitative amount. The crystal thus obtained was recrystallized from petroleum ether-benzene to obtain a thin platy crystal of 8-chloro-2,3-dihydro-2-oxo-4-phenyl-1,6,6-trimethyl-1H, 6H-1,5-benzodiazocine in 70 percent yield.

The comparison between the property of the resulting compound and that of the starting material is given in Table 2.

TABLE 2

| Value of elemental analysis | Starting material | | | The resulting compound | | |
|---|---|---|---|---|---|---|
| | C | H | N | C | H | N |
| Found value (%) | 69.49 | 5.86 | 8.36 | 69.43 | 5.87 | 8.34 |
| Anal. Calcd. for $C_{19}H_{19}N_2OCl$ (%) | 69.59 | 5.86 | 8.57 | 69.59 | 5.86 | 8.57 |
| Melting point (°C) | 167 – 8 | | | 175 | | |
| Molecular ion peak (M+) (m/e) | 326 | | | 326.1159 (326.1185 calculated as $C_{19}H_{19}N_2OCl$) | | |
| IR absorption spectrum (cm$^{-1}$) | 1560 (W) | | | 1555 (W) 1650 (S) | | |
| NMR spectrum (ppm) | 1.25 (S, 3H) 1.34 (S, 3H) 2.61 (S, 3H) 3.03, 3.33 ⎫ 3.38, 3.69 ⎭ AB-type 2H \|J\|=18.0 cps nuclear proton 8H | | | 1.39 (S, 3H) 1.49 (S, 3H) 3.02 (S, 3H) 3.00, 3.26 ⎫ 3.39, 3.65 ⎭ AB-type 2H \|J\|=15.6 cps nuclear proton 8H | | |
| UV absorption spectrum (m$\mu$) | 261 | | | 245, 320 | | |

The ultraviolet absorption spectrum of the product of this reaction denies the indoline skeleton, the infrared absorption spectrum shows the existence of secondary amide and, from the NMR spectrum, which shows the fact that the two adjacent methyl groups are not equivalent and that the hydrogen atoms connected to methylene groups are not equivalent either, it is concluded that the compound is a non-symmetric cyclic compound.

The fragmentation of mass spectrum, the mechanism of production, etc., all support the 8-chloro-2,3-dihydro-2-oxo-4-phenyl-1,6,6-trimethyl-1H,6H-1,5-benzodiazocine structure.

The mechanism of the production is assumed as follows;

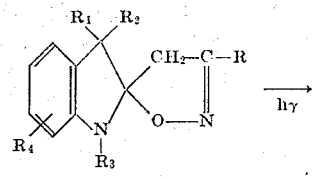

TABLE 1

| Irradiation time (min.) | 0 | 0.5 | 1 | 2 | 3 | 5 | 8 | 10 | 15 | 30 | 40 | 60 |
|---|---|---|---|---|---|---|---|---|---|---|---|---|
| Conversion amount $\alpha$ (%) | 0 | 13 | 27 | 35 | 48 | 68 | 87 | 92 | 99 | 100 | 100 | 100 |

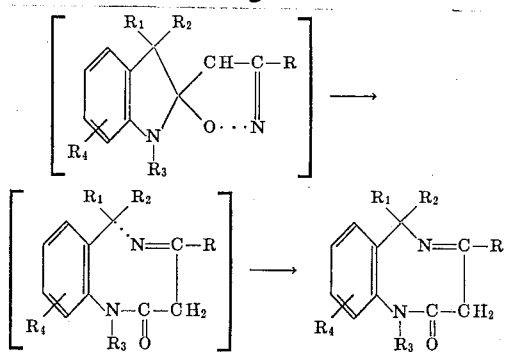

EXAMPLE 2

300 mg of 5-ethoxycarbonyl-3'-phenyl-1,3,3-trimethyl-spiro (indoline-2,5'-isoxazoline-2) was irradiated in the same way as is described in Example 1 and the isomer 2,3-dihydro-8-ethoxycarbonyl-2-oxo-4-phenyl-1,6,6-trimethyl-1H,6H-1,4-benzodiazocine was isolated. The resulting compound has a melting point of 155°–155.5°C, and the molecular ion peak M+ of 364.1762 is observed, which is in agreement with the calculated value of 364.1786 based on $C_{22}H_{24}N_2O_3$. Therefore, the resulting compound is understood to be a photoisomer of the starting material. In addition, in the infrared absorption spectrum, the absorption of tertiary amide which does not exist in the starting material newly appears at 1673 cm$^{-1}$, while the ester absorption at 1714 cm$^{-1}$ remains.

The pattern of the NMR spectrum is the same as that of the starting material, but each of the chemical shifts and bond constants are different. The NMR spectrum is given in Table 3.

TABLE 3

| | Starting material | Photoisomer |
|---|---|---|
| NMR spectrum (ppm) | 1.26 (S, 3H) | 1.43 (S, 3H) |
| | 1.40 (S, 3H) | 1.53 (S, 3H) |
| | 1.24, 1.35, 1.48 (t, 3H) | 1.27, 1.39, 1.51 (t, 3H) |
| | 2.73 (S, 3H) | 3.07 (S, 3H) |
| | 3.08, 3.39 ⎫ AB type 2H | 2.96, 3.21 ⎫ AB type 2H |
| | 3.45, 3.76 ⎭ J =18.6cps | 3.36, 3.62 ⎭ J =15.3cps |
| | 4.16, 4.28, 4.40, 4.52 (q,2H) | 4.20, 4.32, 4.44, 4.56 (q,2H) |

EXAMPLE 3

300 mg of 1,1,3-trimethyl-3'-p-tolyl-spiro(indoline-2,5'-isoxazoline-2) was irradiated and treated in the same way as is described in Example 1 to isolate the isomer 2,3-dihydro-2-oxo-1,6,6-trimethyl-4-p-tolyl-1H,6H-1,5-benzodiazocine in a quantitative amount.

The resulting compound is recrystallized from cyclohexanone in 70 percent yield, and the melting point thereof is 160°C. In the infrared spectrum thereof, the absorption of a tertiary amide appears at 1660 cm$^{-1}$.

EXAMPLE 4

220 mg of 3',3''-bis[1,3,3-trimethyl-spiro(indoline-2,5'-isoxazoline-2)] was dissolved in 150 ml of tetrahydrofuran, and was irradiated in the same way as is described in Example 1, and treated in the same way to yield the 210 mg (95 percent) of crude crystal. The resulting crystal was recrystallized from ethanol-tetrahydrofuran to yield yellowish prismatic crystal of 4,4'-bis(2,3-dihydro-2-oxo-1,6,6-trimethyl-1H, 6H-1, 5-benzodiazocine) having a melting point of 293–4°C. In the infrared absorption spectrum, the resulting compound has the tertiary amide absorption at 1,685 cm$^{-1}$, and $\gamma_c = N$ at 1,567 cm$^{-1}$. In the mass spectrum, molecular ion peak (M+) of 430.2402 was observed.

EXAMPLE 5

200 mg of 3',3''-bis[5-chloro-1,3,3-trimethyl-spiro(indoline-2,5'-isoxazoline-2)] was treated in the same way as is described in Example 4 to yield 140 mg (70 percent) of 4,4'-bis(8-chloro-2,3-dihydro-2-oxo-1,6,6-trimethyl-1H,6H-1,5-benzodiazocine) having a melting point higher than 300°C.

In the infrared spectrum, the resulting compound has the tertiary amide absorption at 1685 cm$^{-1}$ and $\gamma_c = N$ at 1,575 cm$^{-1}$.

EXAMPLE 6

220 mg of 3',3''-bis[5-ethoxycarbonyl-1,3,3-trimethylspiro (indoline-2,5'-isoxazoline-2)] was reacted and treated in the same way as is described in Example 4 to yield 170 mg (77 percent) of 4,4'-bis(8-ethoxycarbonyl-2,3-dihydro-2-oxo-1,6,6-trimethyl-1H,6H-1,5-benzodiazocine). The resulting compound has a melting point of 270-1°C, has the tertiary amide absorption at 1,685 cm$^{-1}$ and $\gamma_c = N$ at 1575 cm$^{-1}$ in the infrared absorption spectrum thereof. The molecular ion peak M+ of 574.2775 is observed which is in agreement with the calculated value of 574.2791 based on $C_{32}H_{38}N_4O_6$.

EXAMPLE 7

400 mg of the high molecular weight compound (reduced viscosity: $\eta$ sp/c = 0.49) having a main chain of spiro(indoline-2,5'-isoxazoline-2) as repeating units and having the chemical formula;

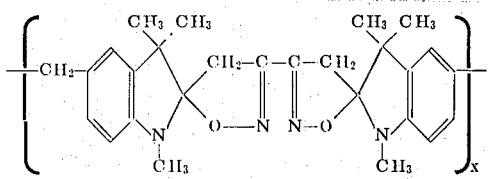

was dissolved in tetrahydrofuran and was reacted for 2 hours in the same irradiation apparatus as that in the earlier Examples. The reaction solution was then concentrated under reduced pressure and, the concentrate was poured into 500 ml of methanol to obtain a precipitate (reduced viscosity: $\eta sp/c = 0.45$).

Figure 2:
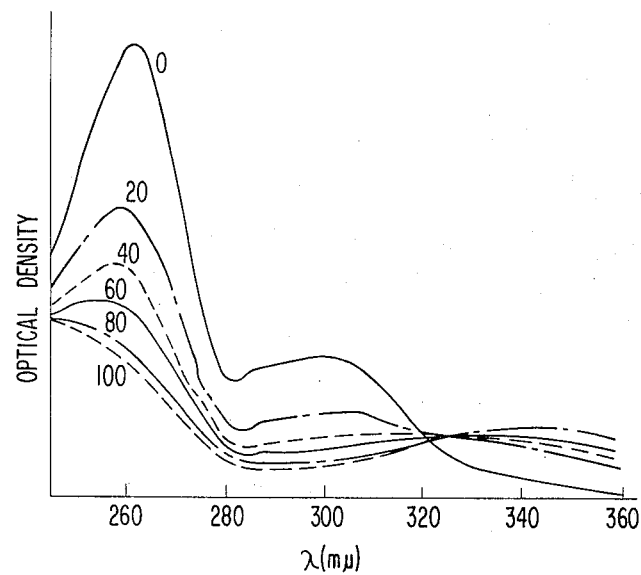

The ultraviolet absorption spectrum of the photoisomerization reaction of the higher molecular compound in Example 7 is given in FIG. 2.

The data was observed by exposing said tetrahydrofuran solution of the compound (3.0 g/l) to the light of the UVL-300P high pressure mercury lamp made by Rikoo Kagaku Sangyo Co., Ltd. for 0, 20, 40, 60, 80 and 100 minutes.

The yield was 350 mg. The resulting compound was reprecipitated in a tetrahydrofuran-methanol system, and various spectra were observed. In the infrared absorption spectrum of this compound, carbonyl absorption (which does not exist in the starting material) appears at 1,680 cm$^{-1}$, which overlaps with the infrared absorption spectrum of 4,4'-bis(8-chloro-2,3-dihydro-2-oxo-1,6,6-trimethyl-1H,6H-1,5-benzodiazocine). In the NMR spectrum, the spectrum of the starting material is not observed at all, and the starting compound was almost completely photoisomerized to the high molecular compound having the 2,3-dihydro-2-oxo-1,6,6-trimethyl-1H,6H-1,5-benzodiazocine skeleton as repeating units. The NMR spectrum is given in Table 4.

The resulting high molecular weight compound can be formulated into film, and strong film was obtained by coating an organic solution of the polymer.

TABLE 4

|  | Starting high molecular compound | Photoisomerized high molecular compound |
|---|---|---|
| NMR spectrum (ppm) | 1.3, 1.2 broad doublet, 6H | 1.4, broad singlet, 6H |
|  | 2.7 broad singlet, 3H | 3.0, broad singlet, 3H |
|  | 3.4 broad singlet, 4H | 3.6, broad singlet, 2H |
|  | 4.0 broad singlet, 2H | 4.0, broad singlet, 4H |
|  | 6.3-7.3 multiplet, 6H | 7.1, broad singlet, 6H |

By a differential thermal analysis an, absorption peak was observed at 244°C. This pattern is similar to that of the starting high molecular weight compound.

What is claimed is:

1. A process for preparing 2,3-dihydro-1H,6H-1,5-benzodiazocine-2-one derivatives represented by the formula (II), comprising irradiating an organic solution of spiro(indoline-2,5'-isoxazoline-2) represented by the formula(I) with light

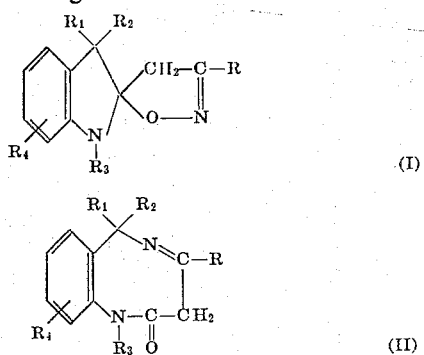

wherein $R_1$, $R_2$ and $R_3$ each represents a hydrogen atom or alkyl group having 1–4 carbon atoms, $R_4$ represents a hydrogen atom, alkyl group having 1–4 carbon atoms, alkoxy group having 1–4 carbon atoms, alkoxycarbonyl group having 1–4 carbon atoms, nitro group, halogen atom or a substituent that forms a dimer bonded through a methylene chain, R represents a phenyl group substituted by the substituent of $R_4$, or a substituent that forms a dimer bonded through an alkyl chain or phenylene group.

2. A process for preparing 2,3-dihydro-1H,6H-1,5-benzodiazocine-2-on derivatives as claimed in claim 1 wherein said organic solution is cyclohexane, methanol tetrahydrofuran.

3. A process for preparing 2,3-dihydro-1H,6H-1,5-benzodiazocine-2-on derivatives as claimed in claim 1 wherein said formula (I) is the compound of the formula (III), and formula (II) is the compound of the formula (IV).

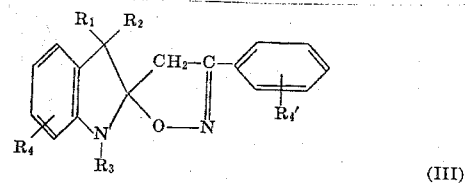

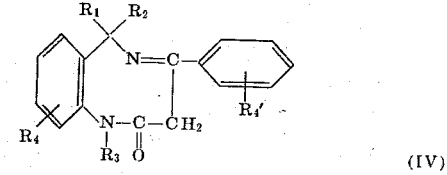

wherein $R_1$, $R_2$ and $R_3$ are a hydrogen atom or alkyl group having 1–4 carbon atoms, $R_4$ and $R_4'$ are a hydrogen atom, alkyl group having 1–4 carbon atoms, alkoxycarbonyl group having 1–4 carbon atoms, nitro group or a halogen atom.

4. A process for preparing 2,3-dihydro-1H,6H-1,5-benzodiazocine-2-on derivatives as claimed in claim 3 wherein said formula (III) is the compound of the formula (a), and formula (IV) is the compound of the formula (b)

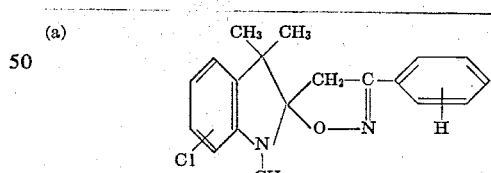

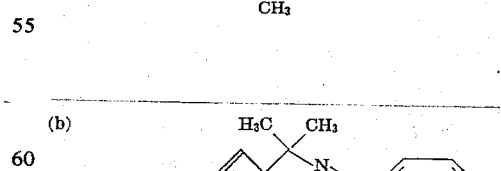

5. A process for preparing 2,3-dihydro-1H,6H-1,5-benzodiazocine-2-on derivatives as claimed in claim 3 wherein said formula (III) is the compound of the formula (c), and formula (IV) is the compound of the formula (d)

(c) 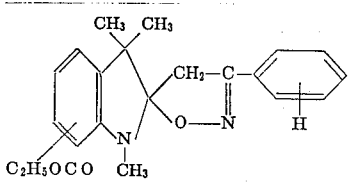

(d) 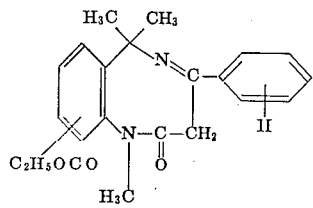

6. A process for preparing 2,3-dihydro-1H,6H-1,5-benzodiazocine-2-on derivatives as claimed in claim 3 wherein said formula (III) is the compound of the formula (e), and formula (IV) is the compound of the formula (f)

(e) 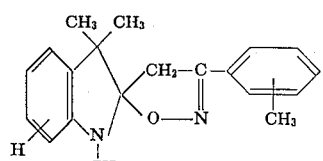

(f) 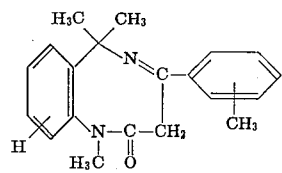

7. A process for preparing 2,3-dihydro-1H,6H-1,5-benzodiazocine-2-on derivatives as claimed in claim 3 wherein said formula (III) is the compound of the formula (g), and formula (IV) is the compound of the formula (h)

(g) 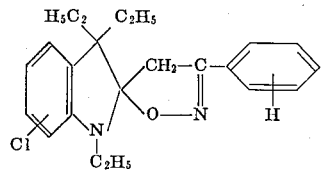

(h) 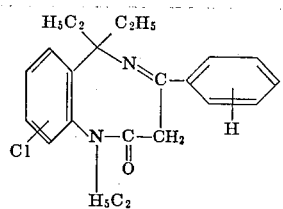

8. A process for preparing 2,3-dihydro-1H,6H-1,5-benzodiazocine-2-on derivatives as claimed in claim 1 wherein said formula (I) is the compound of the formula (V), and formula (II) is the compound of the formula (VI)

(V) 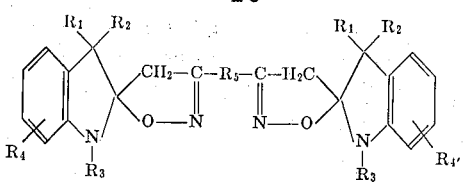

(VI) 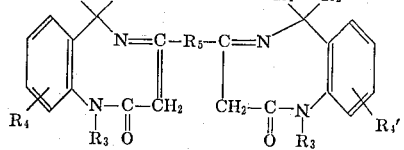

wherein $R_1$, $R_2$ and $R_3$ are a hydrogen atom or alkyl group having 1–4 carbon atoms, $R_4$ and $R_4'$ are a hydrogen atom, alkyl group having 1–4 carbon atoms, alkoxycarbonyl group having 1–4 carbon atoms, nitro group or a halogen atom, $R_5$ represents direct bond, $+CH_2+$ or

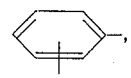

$n$ being 0, 1, 2 or 3.

9. A process for preparing 2,3-dihydro-1H,6H-1,5-benzodiazocine-2-on derivatives as claimed in claim 8 wherein said formula (V) is the compound of the formula (i), and formula (VI) is the compound of the formula (j)

(i) 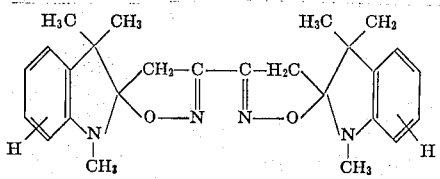

(j) 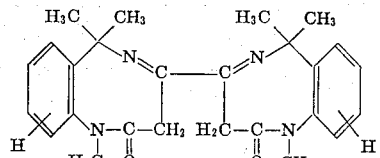

10. A process for preparing 2,3-dihydro-1H,6H-1,5-benzodiazocine-2-on derivatives as claimed in claim 8 wherein said formula (V) is the compound of the formula (k), and formula (VI) is the compound of the formula (l)

(k) 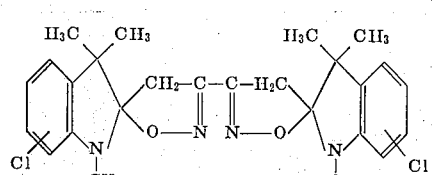

(l) 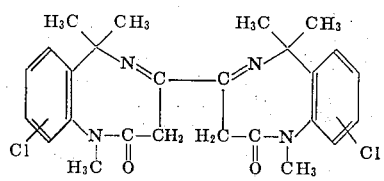

11. A process for preparing 2,3-dihydro-1H,6H-1,5-bezodiazocine-2-on derivatives as claimed in claim 8 wherein said formula (V) is the compound of the formula (m), and formula (VI) is the compound of the formula (n)

(m)
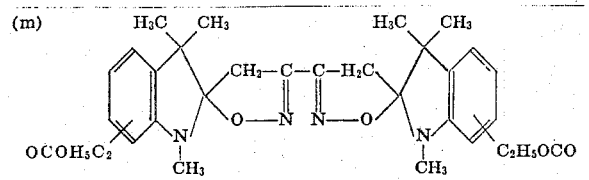

(n)
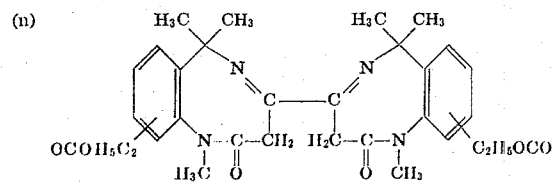

12. A process for preparing 2,3-dihydro-1H,6H-1,5-benzodiazocine-2-on derivatives as claimed in claim 8 wherein said formula (V) is the compound of the formula (o), and formula (VI) is the compound of the formula (p)

(o)
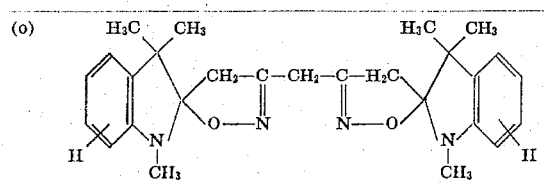

(p)
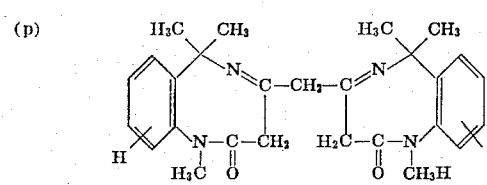

13. A process for preparing 2,3-dihydro-1H,6H-1,5-benzodiazocine-2-on derivatives as claimed in claim 1 wherein said formula (I) is the compound of the formula (VII), and formula (II) is the compound of the formula (VIII).

(VII)
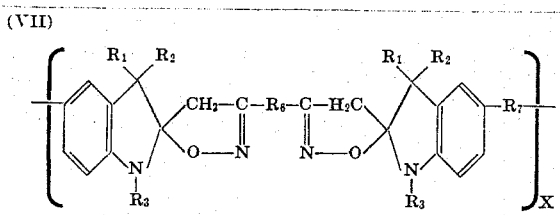

(VIII)
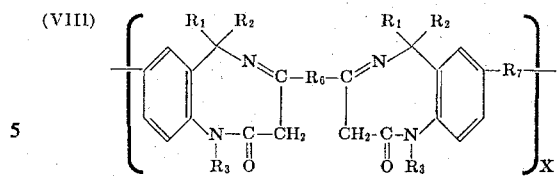

wherein $R_1$, $R_2$ and $R_3$ each represents a hydrogen atom or alkyl group having 1–4 carbon atoms; $R_6$ represents $+CH_2+_n$ or

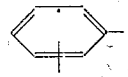

$R_7$ represents $—CH_2—_n$; $n$ being 0 or an integer of 1 to 3; X represents degree of polymerization.

14. A process for preparing 2,3-dihydro-1H,6H-1,5-benzodiazocine-2-on derivatives as claimed in claim 13 wherein said formula (VII) is the compound of the formula (q), and formula (VIII) is the compound of the formula (r).

(q)
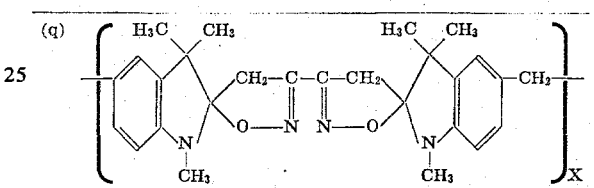

(r)
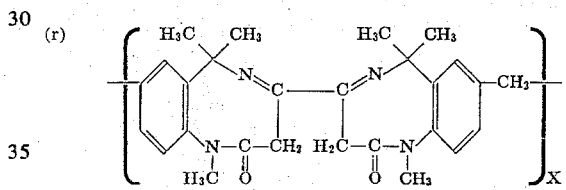

wherein X represents the degree of polymerization.

15. A process for preparing 2,3-dihydro-1H,6H-1,5-benzodiazocine-2-on derivatives as claimed in claim 13 wherein said formula (VII) is the compound of the formula (s), and formula (VIII) is the compound of the formula (t).

(s)
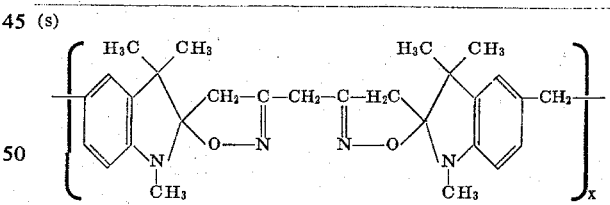

(t)
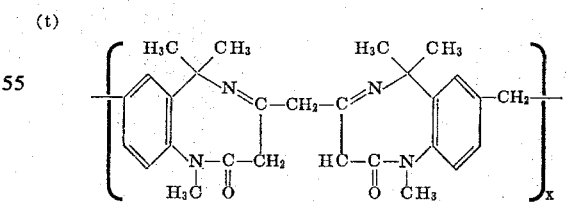

wherein X represents the degree of polymerization.

* * * * *